United States Patent [19]

Ayres

[11] 4,286,799

[45] Sep. 1, 1981

[54] KINGPIN ASSEMBLY AND METHOD FOR MAKING SAME

[75] Inventor: Robert L. Ayres, New Wilmington, Pa.

[73] Assignee: Rockwell International Corporation, Pittsburgh, Pa.

[21] Appl. No.: 76,654

[22] Filed: Sep. 18, 1979

[51] Int. Cl.³ ............................................... B62D 7/18
[52] U.S. Cl. ................................... 280/96.1; 403/154; 403/378
[58] Field of Search ....................... 280/96.1, 97, 96.3; 151/25 R, 26; 403/154, 156, 378, 379

[56] References Cited

U.S. PATENT DOCUMENTS

| | | | |
|---|---|---|---|
| 2,916,295 | 12/1959 | Sandberg | 280/96.1 |
| 3,300,230 | 1/1967 | Spencer | 280/96.1 |
| 3,438,647 | 4/1969 | Fraboni et al. | 280/96.1 |
| 3,915,469 | 10/1975 | Vanice | 280/96.1 |

FOREIGN PATENT DOCUMENTS 258316  5/1963  Australia ............................... 280/96.1

Primary Examiner—Joseph F. Peters, Jr.
Assistant Examiner—Norman L. Stack, Jr.

[57] ABSTRACT

A kingpin assembly is for a steering axle of the type which includes an inner axle member which pivotally supports at a mounting bore in each end thereof a steering knuckle and spindle extending outwardly therefrom. The kingpin includes an upper and lower section and an intermediate section therebetween. The intermediate section is provided with a helically splined outer surface which is rigidly retained within the splined mounting bore by an interference fit therebetween. The rigid upper and lower yoke arms of the steering knuckle are respectively pivotally mounted about the upper section and the lower section of the kingpin.

11 Claims, 3 Drawing Figures

KINGPIN ASSEMBLY AND METHOD FOR MAKING SAME

BACKGROUND OF THE INVENTION

1. Field of the Invention

This invention relates to a kingpin assembly for a steering axle and, more particularly, to such a kingpin assembly which includes an intermediate section thereof having a helically splined outer surface adapted to produce an interference fit with a splined mounting bore through the end of an inner axle member of the axle to rigidly retain the kingpin in position as a steering knuckle is pivotally mounted thereon.

2. Description of the Prior Art

Steering axles are well known in the prior art to include an inner axle member with a kingpin rigidly mounted in a mounting bore at each end thereof. Upper and lower sections of the kingpin are adapted to pivotally support a steering knuckle having rigid upper and lower yoke arms. A spindle extending outwardly from the steering knuckle is adapted to rotatably support a vehicle wheel of the steering axle.

It is of primary concern in some kingpin assemblies that the kingpin be rigidly secured within the mounting bore at the end of the inner axle member to insure that pivotal movement between the members is limited to the upper and lower yoke arms as they rotate about the upper and lower sections of the kingpin. Various methods are employed for rigidly providing kingpin assemblies of this type such as those generally disclosed in U.S. Pat. Nos. 1,637,089; 2,512,881; 2,916,295; 3,294,413 and 3,915,469.

Typically, the kingpin is rigidly retained within the mounting bore of the inner axle member by a slot and key configuration requiring a number of additional parts and additional steps in the manufacturing operation. Although these methods of insuring the rigid mounting of the kingpin have generally been satisfactory, there is a continuing need to decrease the overall expenses of manufacture while still providing a reliable kingpin assembly.

SUMMARY OF THE INVENTION

It is, therefore, an object of this invention to provide a kingpin assembly which is reliable and inexpensive to manufacture.

It is another object of this invention to provide a kingpin assembly of the type described which includes an intermediate section on the kingpin thereof which utilizes helical splines to produce an interference fit with axially aligned splines within a mounting hole of the inner axle member for rigidly retaining the kingpin therein.

It is yet another object of this invention to provide a kingpin assembly of the type described in which the axially aligned cylindrical bores through the upper and lower yoke arms of the spindle have equal diameters for simple, effective and inexpensive manufacturing purposes.

It is still another object of this invention to provide a method for providing the kingpin assembly of the type described.

To accomplish these and other objects of the invention, a preferred embodiment thereof includes a kingpin assembly for a steering axle of the type which includes an inner axle member having a mounting bore at each end thereof and is capable of supporting the kingpin assembly at each end which, in turn, pivotally supports a steering knuckle and spindle extending outwardly therefrom. The steering knuckle includes rigid first and second yoke arms having axially aligned first and second cylindrical bores respectively therethrough. The kingpin assembly includes a kingpin having first and second end sections and an intermediate section therebetween. The first section is cylindrical with a first diameter less than the diameter of the first cylindrical bore and the second section is cylindrical with a second diameter less than the diameter of the second cylindrical bore. The intermediate section is generally cylindrical with a helically splined outer surface and has an outer diameter less than the diameter of the second cylindrical bore and greater than the first diameter. The mounting bore has a splined inner surface with the splines thereof being parallel with the axis of the mounting bore. The mounting bore also has a cross sectional shape generally matching the cross sectional shape of the intermediate section of the kingpin and a minimum internal diameter greater than the first diameter of the first section of the kingpin. The intermediate section of the kingpin is rigidly retained within the mounting bore by an interference fit between the helically splined outer surface and the splined inner surface as the first section and second section extend outwardly of the mounting bore of the inner axle member. The first yoke arm is pivotally mounted about the first section of the kingpin and the second yoke arm is pivotally mounted about the second section of the kingpin. The invention also includes a preferred method for providing the kingpin assembly.

DESCRIPTION OF THE INVENTION

Figure 1:
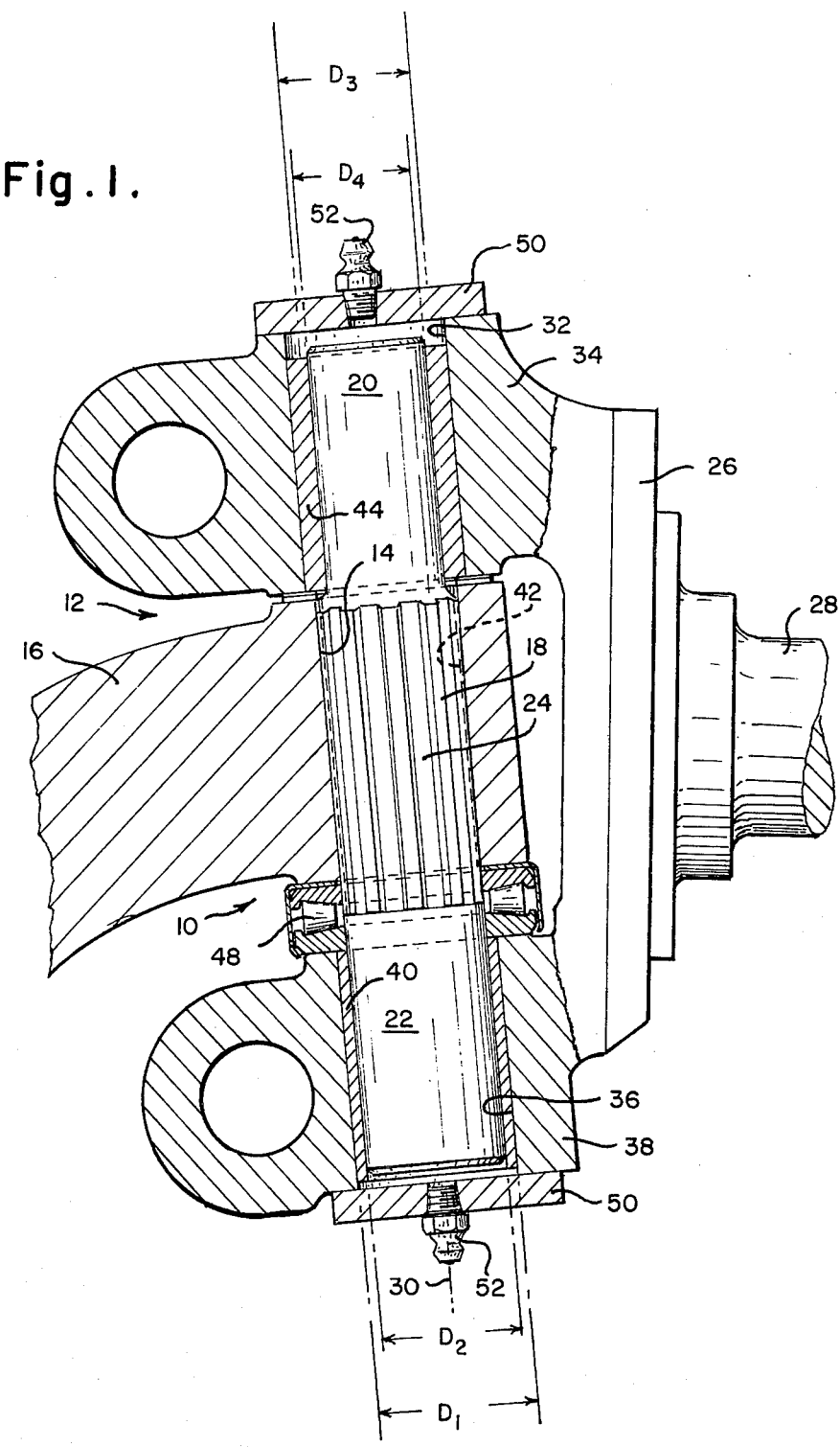
FIG. 1 is a side view shown partially in section of the kingpin assembly as it is mounted on the end of an inner axle member of a steering axle.

As seen in FIG. 1, the preferred kingpin assembly 10 is provided for a steering axle 12. The steering axle 12 is of the type which includes an inner axle member (partially shown) having a mounting bore 14 at each end 16 thereof which is capable of supporting the kingpin assembly 10. The kingpin assembly 10 includes a kingpin 18 thereof having an upper section 20, a lower section 22 and an intermediate section 24 therebetween. It is desirable in steering axles of this type for the kingpin to be rigidly secured within the mounting hole of the inner axle member throughout axle operation.

With a kingpin of this type being securely mounted at the end of an inner axle member, it is capable of pivotally supporting a steering knuckle 26 which has a spindle 28 extending outwardly therefrom. The spindle 28 is then capable of supporting a vehicle wheel (not shown) in a manner which is well known in the prior art.

As mentioned hereinabove, it has been a well accepted practice in the prior art of installing a kingpin within a mounting hole and then of assuring its retention therein with the aid of some type of slot and key configuration. Generally, the surface of the intermediate section of the kingpin is provided one or more tangential slots and some type of bolt or key member is extended through the end of the inner axle member to tangentially intersect the mounting bore to produce interfering contact with the intermediate section of the kingpin. This form of securing the kingpin within the inner axle member has been satisfactorily employed in the past but does somewhat complicate installation and manufacture. The tolerances required and additional manufacturing requirements should not be minimized because of the inherent problems which exist as one is attempting to cut a tangential slot in a cylindrical member and drilling a hole that tangentially intersects a larger bore. This method, obviously, requires additional hardware to provide the key device and does require some alignment problems during installation of the members.

Accordingly, the present invention eliminates these problems by providing a helically splined outer surface for the intermediate section 24. The inner surface of the mounting bore 14 is also splined but the splines thereof are parallel with the central axis 30 of the kingpin assembly 10. Providing the helical splines with a predetermined helical angle allows the kingpin 18 to be installed in the mounting bore 14 with the interference fit between the helical splines and the splined interior surface of the mounting bore being sufficient to insure retention of the kingpin 18 in the mounting bore 14 throughout operation.

As thus explained, the present invention does not appear to be significantly different from a number of splined connections as shown in the prior art. For example, U.S. Pat. Nos. 1,803,995; 3,222,772 and 3,360,961 disclose mounting two rigid members with angularly displaced splines therebetween to produce an interference fit. However, the utilization of a steering knuckle with rigid yoke arms and the method generally used to install the kingpin complicate the design of such a splined connection. For example, one could not simply add a splined area to the kingpin which includes outwardly extending splines if these splines would prevent insertion of the kingpin into the cylindrical bore of the lower yoke arm. Similarly, the splines could not be simply cut into a cylindrical kingpin since the splines in the mounting bore would extend inwardly to such a degree that the upper section of the kingpin could not be readily inserted through the mounting bore.

Generally, there are certain features desirable in a kingpin assembly which improve its reliability during use, decrease the manufacturing expense and simplify the installation. To provide these features, the preferred kingpin assembly 10 has a specific configuration and includes basic dimensional requirements which were unnecessary in the previously mentioned splined connections, allowing such a connection to be utilized in an area where it would not heretofore have been considered possible. For example, to provide proper pivotal mounting of the steering knuckle 26, the cylindrical bore 32 of the upper yoke arm 34 and the cylindrical bore 36 of the lower yoke arm 38 must be accurately, axially alinged with the axis 30. To insure accurate axial alignment, it is common practice to provide blank bores for each yoke arm which are generally aligned when the rigid steering knuckle 26 is formed. A broaching machine is utilized to broach both cylindrical bores 32 and 36 at the same time, giving them identical interior diameters $D_1$ and assuring the required axial alignment. This feature can be found in each of the prior art kingpin configurations disclosed in the above mentioned patents. This feature does not present any installation or other manufacturing problems when a simple cylindrical kingpin is utilized. However, as mentioned above, simply adding splines to an intermediate section of the kingpin and the mounting bore would interfere with installation of the kingpin from the lower yoke arm to the upper yoke arm without some special adaptation of the kingpin.

Accordingly, in the kingpin of the present invention, the lower section 20 is cylindrical and includes a diameter $D_2$ which is less than the diameter $D_1$ of the cylindrical bore 36. In fact, the diameter $D_2$ is in the preferred embodiment sufficiently smaller than the diameter $D_1$ to allow the installation of a tubular bushing 40 therebetween. The intermediate section 24 is, as above mentioned, helically splined and includes an outer diameter which is also less than the diameter $D_1$ of cylindrical bore 36 to allow axial installation of the kingpin 18 through the bore 36 and is preferably approximately equal to the diameter $D_2$ to simplify final machining of the kingpin during its manufacture.

The splines in the mounting bore 14 are aligned with the axis 30 but include a cross sectional shape generally matching the cross sectional shape of the intermediate section 24 to allow insertion of the intermediate section therein. A maximum diameter of the mounting bore 14 is not really critical but should be sufficiently close to the outer diameter of the intermediate section 24 to insure that the splines are provided sufficient integrity. However, the minimum diameter $D_3$ of the mounting bore 14 (indicated by 42 in FIG. 1) will be predetermined and must be greater than the diameter $D_4$ of the upper section 20 of the kingpin to enable the kingpin 18 to be fully axially received in the position as shown in FIG. 1. Obviously, this diameter $D_4$ of the upper section 20 will be smaller than the internal diameter of the cylindrical bore 32 of the upper yoke arm 34 in the present configuration employing equal diameters $D_1$ for the upper and lower cylindrical bores.

A comparison of the diameter $D_1$ of the upper cylindrical bore and the diameter $D_4$ of the upper section 20 of the kingpin reveals a significant departure from the kingpins disclosed in the above mentioned patents. Although it is obvious that the diameter of the upper cylindrical bore need not be as large as it is in the preferred kingpin assembly 10 to accommodate the upper section 20 of the kingpin, the diameter $D_1$ is preferred for the reasons mentioned hereinabove. Accordingly, the preferred kingpin assembly 10 is provided a tubular bushing 44 for the upper cylindrical bore which is similar to the tubular bushing 40 for the lower cylindrical bore. However, the tubular bushing 44 is provided a wall thickness significantly larger than one would normally utilize in the steering axle art and has been specifically designed to accommodate both the configuration of the kingpin 18 and the preferred method for forming the steering knuckle 26.

To make the preferred kingpin assembly 10 as thus described, the inner axle member of the steering axle 12 is formed of steel and is provided a blank mounting bore for eventual receipt of the kingpin 18 therein. Normally, the blank mounting bore would be broached with a broaching machine for dimensioning. Since the mounting bore 14 of the kingpin assembly 10 must include a plurality of splines, the same broaching tool could not be utilized. However, there are broaching tools which are capable of being utilized in a broaching machine to form splines of the type described for the mounting bore 14 and, therefore, broaching in this manner does not really complicate manufacture of the kingpin assembly 10.

Similarly, the steering knuckle 26 is preformed to include blank cylindrical bores in the upper and lower yoke arms and these are broached simultaneously for proper sizing and alignment as mentioned hereinabove. The tubular bushings 40 and 44 are then respectively installed in the cylindrical bores 36 and 32 prior to actual assembly with the inner axle member.

Figure 2:
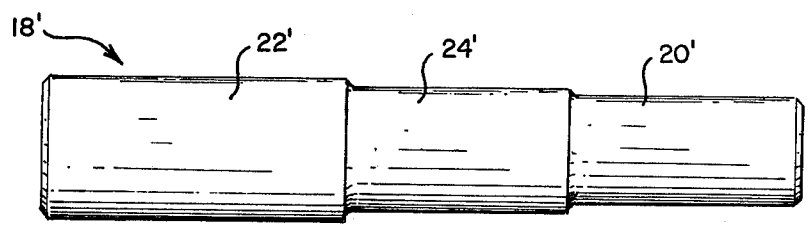
FIG. 2 is a kingpin blank from which the kingpin of the present invention is manufactured.

As seen in FIG. 2, the kingpin blank 18' is formed of steel and includes an upper section 20', a lower section 22' and an intermediate section 24' therebetween. The upper section 20' and the lower section 22' include diameters which are similar to the diameters $D_4$ and $D_2$ subject only to a final heat treatment and finish grinding after the splines of the intermediate section 24' are formed. It should be noted that the diameter of the intermediate section 24' is generally between that of the upper section and lower section which is consistent with the method of forming the helical splines thereon.

Figure 3:
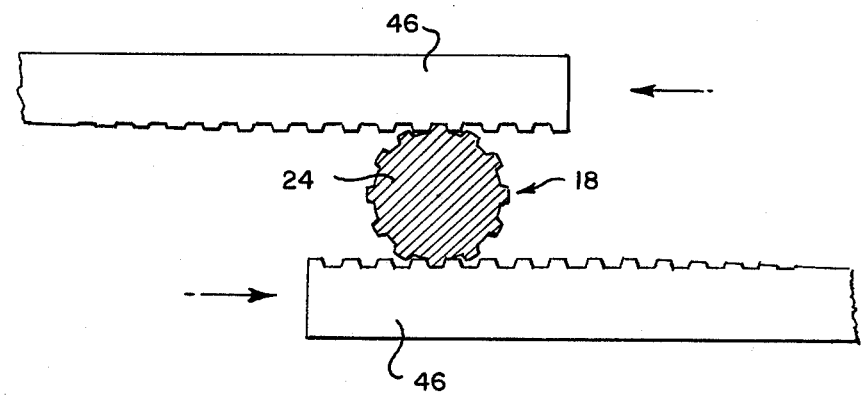
FIG. 3 is a sectional view of the cross section of the intermediate section of the kingpin as it is being formed in the preferred method of this invention.

As seen in FIG. 3, the intermediate section of the kingpin 18 is preferably formed by machine rolling the helical splined surface thereon. To roll the helical splined surface in this manner, there are a number of commercially available machines which include two rack-type forming tools mounted on upper and lower hydraulic actuated slides. The blank kingpin 18' is positioned between the forming tools as generally shown in FIG. 3. Each forming tool 46 has a working surface adapted to form the desired helical spline as it tangentially passes along the surface of the rotating work product. The forming tool 46 includes raised and lowered portions which progressively displace metal from the work product. Accordingly, the height distance between these raised and lowered portions at the leading section of the forming tool 46 is less than it is at the trailing section in order to provide for the progressive forming. As seen in FIG. 3, the forming tools 46 have actually completed the formation of the intermediate section 24 to provide the general dimensions as described hereinabove for the preferred kingpin 18 subject only to heat treating and finish grinding.

During actual assembly, the steering knuckle 26 is positioned in alignment with the mounting bore 14. A thrust bearing 48 is installed between the lower yoke arm 38 and the end 16 of the inner axle member. With the cylindrical bores 32 and 36 being generally aligned with the mounting bore 14, the kingpin 18 is installed at the lower end of the cylindrical bore 36. The upper section 20 of the kingpin 18 passes through the cylindrical bore 36 and the mounting bore 14 until the helical splines of the intermediate section 24 engage with the splines of the mounting bore 14. The kingpin 18 is then driven into the position as shown in FIG. 1 against the resistance of the interaction of the splines until the desired interference fit is established upon complete insertion. A pair of cover plates 50 with grease fittings 52 installed thereon are then mounted over the cylindrical bores 32 and 36 to provide sealing for lubrication of the steering knuckle 26.

As thus described, the kingpin assembly 10 includes a preferred kingpin 18 with the diameter $D_2$ of about 1.79 inches and a diameter $D_4$ of about 1.62 inches. The intermediate section 24 includes 34 helical splines with a minor diameter greater than the diameter $D_4$ and a major diameter approximately the same as the diameter $D_2$. With the material of the preferred kingpin 18 being 4140H steel, it has been found that a helix angle of approximately 1/5 of 1 degree will produce the desired interference fit with the matching 34 splines of the mounting bore 14. Obviously, the helical angle and the number of splines might be altered depending upon the exact nature of the materials to be used. Diameter $D_1$ of the preferred cylindrical bores is approximately 1.92 inches. Obviously, tubular bushings 40 and 44 are dimensioned to be rigidly received within their respective cylindrical bores and include a sufficient internal clearance to allow rotation about the upper and lower sections of the kingpin 18 in a manner well known in the bearing art.

Throughout the specification and drawings, reference has been made to the upper and lower sections of the kingpin and to the upper and lower yoke arms. It should be clear to one skilled in the steering axle art that, while the kingpin assembly 10 described herein refers to the preferred configuration, a mechanical equivalent could be designed with the lower section of the kingpin being provided the smaller dimension for a configuration in which the kingpin is installed through the upper yoke arm for eventual retention within the mounting bore. Accordingly, the claims are drafted to refer to the first and second yoke arms and first and second end sections of the kingpin to include either possible configuration.

I claim:
1. A kingpin assembly for a steering axle of the type which includes an inner axle member having a mounting bore at each end thereof and is capable of supporting said kingpin assembly at said each end which in turn pivotally supports a steering knuckle and spindle extending outwardly therefrom, said steering knuckle including rigid first and second yoke arms having axially aligned first and second cylindrical bores respectively therethrough, said kingpin assembly comprising:
   a kingpin having first and second end sections and an intermediate section therebetween;
   said first section being cylindrical with a first diameter less than the diameter of said first cylindrical bore and the diameter of said second cylindrical bore;
   said second section being cylindrical with a second diameter less than said diameter of said second cylindrical bore;
   said intermediate section being generally cylindrical with a helically splined outer surface and having an outer diameter greater than said first diameter of said first section and less than said diameter of said second cylindrical bore so that said first section and said intermediate section can be axially passed through said second cylindrical bore during assembly;
   said mounting bore having a splined inner surface with the splines thereof being parallel with an axis of said mounting bore, said mounting bore having a cross sectional shape generally matching a cross sectional shape of said intermediate section of said kingpin, said mounting bore having a minimum internal diameter greater than said first diameter of said first section of said kingpin so that said first section of said kingpin can be axially passed through said mounting bore during assembly;
   said intermediate section of said kingpin being rigidly retained within said mounting bore by an interference fit between said helically splined outer surface and said splined inner surface of said first section and said second section extend outwardly of said mounting bore of said inner axle member;

said first yoke arm being pivotally mounted about said first section of said kingpin; and said second yoke arm being pivotally mounted about said second section of said kingpin.

2. A kingpin assembly as set forth in claim 1, further including a first tubular bushing within said first cylindrical bore of said first yoke arm for receipt of said first section therein.

3. A kingpin assembly as set forth in claim 2, wherein said diameter of said first cylindrical bore and said diameter of said second cylindrical bore are equal.

4. A kingpin assembly as set forth in claim 3, further including a second tubular bushing within said second cylindrical bore of said second yoke arm for receipt of said second section therein.

5. A kingpin assembly as set forth in claim 1, wherein said inner axle member about said mounting bore and said intermediate section of said kingpin are made of steel and said helically splined outer surface of said intermediate section includes a plurality of splines with a helical angle of about one-fifth of a degree to establish said interference fit.

6. A kingpin assembly as set forth in claim 1, further including a thrust bearing means around said kingpin below said inner axle member and immediately adjacent thereto.

7. A method of providing a kingpin assembly for a steering axle of the type which includes an inner axle member capable of supporting said kingpin assembly at each end thereof which in turn pivotally supports a steering knuckle and spindle extending outwardly therefrom, said steering knuckle including rigid first and second yoke arms having axially aligned first and second cylindrical bores respectively therethrough, said cylindrical bores having identical bore diameters, said method comprising:

providing a generally cylindrical kingpin blank with first and second end sections and an intermediate section therebetween;

forming helical splines on a surface of said intermediate section;

finish grinding said kingpin blank to provide a kingpin, said first section being cylindrical with a first diameter less than said bore diameter, said second section being cylindrical with a second diameter less than said bore diameter, said intermediate section being generally cylindrical with an outer diameter greater than said first diameter and less than said bore diameter so that said first section and said intermediate section can be axially passed through said second cylindrical bore;

forming a mounting bore at said end of said inner axle member with a splined inner surface with the splines thereof being parallel with an axis of said mounting bore, with a cross sectional shape generally matching a cross sectional shape of said intermediate section of said kingpin, and with a minimum internal diameter greater than said first diameter of said first section of said kingpin so that said first section of said kingpin can be axially passed through said mounting bore and less than said second diameter of said second section so that said second section cannot be axially passed through said mounting bore;

installing said first and said second yoke arms about said end of said inner axle member with said cylindrical bores therethrough being axially aligned with said mounting bore;

inserting said kingpin said first section first into said cylindrical bore of said second yoke arm, said mounting bore and said cylindrical bore of said first yoke arm;

forcing said intermediate section into said mounting bore to produce an interference fit between said helical splines and said splined inner surface to rigidly retain said kingpin in said end of said inner axle member with said knuckle pivotally mounted thereon;

installing a first tubular bushing within said first cylindrical bore of said first yoke arm around said first section therein; and installing a second tubular bushing within said second cylindrical bore of said second yoke arm around said second section therein, said first tubular bushing having a wall thickness greater than the wall thickness of said second tubular bushing to accommodate the difference in said first diameter of said first section and said second diameter of said second section relative to said bore diameters of their respective said cylindrical bores.

8. A method of providing a kingpin assembly as set forth in claim 7, wherein said forming said mounting bore is accomplished by broaching said splined inner surface from a blank bore through said end of said inner axle member.

9. A method of providing a kingpin assembly as set forth in claim 7, wherein said forming said helical splines is accomplished by cold forming as said intermediate section is rolled between opposed rack forming tools.

10. A method of providing a kingpin assembly as set forth in claim 7, wherein said kingpin and said inner axle member are made of steel and said helical splines are provided a helical angle of about one-fifth of a degree to establish said interference fit.

11. A method of providing a kingpin assembly as set forth in claim 7, including the additional step of installing a thrust bearing means around said mounting bore and below said inner axle member and immediately adjacent thereto prior to said inserting said kingpin.

* * * * *